US011897273B2

(12) United States Patent
Shimoda

(10) Patent No.: US 11,897,273 B2
(45) Date of Patent: Feb. 13, 2024

(54) PRINT DEVICE

(71) Applicant: BROTHER KOGYO KABUSHIKI KAISHA, Nagoya (JP)

(72) Inventor: Koshiro Shimoda, Tokoname (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 65 days.

(21) Appl. No.: 17/825,667

(22) Filed: May 26, 2022

(65) Prior Publication Data

US 2022/0379639 A1 Dec. 1, 2022

(30) Foreign Application Priority Data

May 31, 2021 (JP) ................................ 2021-090814

(51) Int. Cl.
*B41J 25/312* (2006.01)
*B41J 11/20* (2006.01)
*B41J 2/335* (2006.01)
*B41J 2/32* (2006.01)

(52) U.S. Cl.
CPC ............... *B41J 25/312* (2013.01); *B41J 2/32* (2013.01); *B41J 2/33515* (2013.01); *B41J 11/20* (2013.01); *B41J 2202/14* (2013.01)

(58) Field of Classification Search
CPC ...... B41J 25/312; B41J 25/001; B41J 25/003; B41J 25/308; B41J 2/33515; B41J 11/20; B41J 2202/14; B41J 25/3082; B41J 25/3084; B41J 25/3086; B41J 25/3088; B41J 25/304; B41J 25/316; B41J 2/32; B41J 29/377
See application file for complete search history.

(56) References Cited

U.S. PATENT DOCUMENTS

2016/0185135 A1* 6/2016 Aizawa ...................... B41J 2/32 347/197
2017/0021644 A1* 1/2017 Goto ...................... B41J 25/308

FOREIGN PATENT DOCUMENTS

JP 2001-88398 A 4/2001
JP 2002234204 * 8/2002 ................ B41J 3/20

* cited by examiner

*Primary Examiner* — Kristal Feggins
(74) *Attorney, Agent, or Firm* — KENEALY VAIDYA LLP

(57) ABSTRACT

A print device includes a head unit holding a heat sink, a head holding member holding the head unit, a platen roller, a support shaft supporting the head holding member to pivot between a close position and a separated position, an urging member, and an adjustment mechanism including an adjustment shaft and an eccentric cam. The separated position is a position where the print head is separated from the platen roller than the close position. The urging member urges the head unit and applies a pressing load pressing the print head against the platen roller. The eccentric cam rotates around the adjustment shaft and coming into contact with the head holding member in a state of being offset with respect to the adjustment shaft. The adjustment mechanism adjusts a position of heating elements of the heat sink with respect to the platen roller by rotating of the eccentric cam.

16 Claims, 10 Drawing Sheets

PRINT DEVICE

CROSS-REFERENCE TO RELATED APPLICATIONS

This application claims priority to Japanese Patent Application No. 2021-090814, filed on May 31, 2021, the content of which is hereby incorporated by reference.

BACKGROUND

The present disclosure relates to a print device.

A thermal line printer is known. This line printer includes a position adjustment mechanism provided between a print head and a head bracket attached to the print head. Using an eccentric cam, the position adjustment mechanism causes the print head to move relative to the head bracket, and adjusts a positional relationship between the print head and a platen in a feed direction of a recording sheet. After adjusting the position, the print head is fixed to the head bracket using a fixing screw.

SUMMARY

In the above-described line printer, an adjustment direction of the eccentric cam using a tool, and a fixing direction of the fixing screw are opposite directions. Thus, when a pressing load adjustment mechanism that presses the print head against the platen is provided, there is a possibility that, in order to avoid interference with the position adjustment mechanism, an increase in size of a configuration may result.

The object of the present disclosure is to provide a print device that can achieve downsizing of a unit capable of adjusting a positional relationship of a head unit with respect to a platen roller.

A print device according to the present disclosure includes a head unit, a head holding member, a platen roller, a support shaft, an urging member, and an adjustment mechanism. The head unit is configured to hold a heat sink. The print head is fixed to the heat sink. A plurality of heating elements is aligned in a first direction in the print head. The head holding member is configured to hold the head unit in a second direction intersecting the first direction. The platen roller is configured to rotate around a rotation shaft extending in the first direction. The support shaft extends in the first direction. The support shaft is configured to support the head holding member to pivot between a close position and a separated position. The close position is a position where the print head is close to the platen roller, and the separated position is a position where the print head is separated from the platen roller further than the close position. The urging member is configured to urge the head unit and to apply a pressing load pressing the print head against the platen roller. The adjustment mechanism includes an adjustment shaft and an eccentric cam. The adjustment mechanism is provided at the heat sink, at a position between the support shaft and an urging section in a third direction. The adjustment mechanism is configured to adjust a position of the heating elements with respect to the platen roller when the print head is at the close position, by the head unit moving relative to the head holding member as a result of rotation of the eccentric cam. The adjustment shaft protrudes to a side of the head holding member and extends in the second direction. The eccentric cam is configured to rotate around the adjustment shaft and to comes into contact with the head holding member in a state of being offset with respect to the adjustment shaft. The third direction is a direction intersecting the first direction and the second direction. The urging section is a section urging the head unit, using the urging member.

The print device according to the present aspect is provided with the adjustment mechanism at a position between the support shaft and the urging section with which the urging member is able to apply the sufficient pressing load to the head unit held by the head holding member that pivots while being supported by the support shaft. As a result, the print device can achieve downsizing of a unit, and can thus achieve downsizing of a manufactured product.

BRIEF DESCRIPTION OF THE DRAWINGS

Embodiments of the disclosure will be described below in detail with reference to the accompanying drawings in which.

DETAILED DESCRIPTION

An embodiment of a print device 1 according to the present disclosure will be described with reference to the drawings. The referenced drawings are to be used for illustrating the technological characteristics that may be employed by the present disclosure, and are merely illustrative examples that are in no way intended to limit the configuration and the like of the described device thereto. The upper side, the lower side, the upper left side, the lower right side, the lower left side, and the upper right side in FIG. 1 are, respectively, an upper side, a lower side, a left side, a right side, a front side, and a rear side of the print device 1.

Overview of Print Device 1

An overview of the print device 1 will be described with reference to FIG. 1 to FIG. 3. The print device 1 is a thermal transfer print device. The print device 1 performs an operation (hereinafter referred to as a "printing operation") to heat an ink ribbon using a print head 50 (refer to FIG. 3) and transfer ink from the ink ribbon onto a print medium 90.

Figure 1:
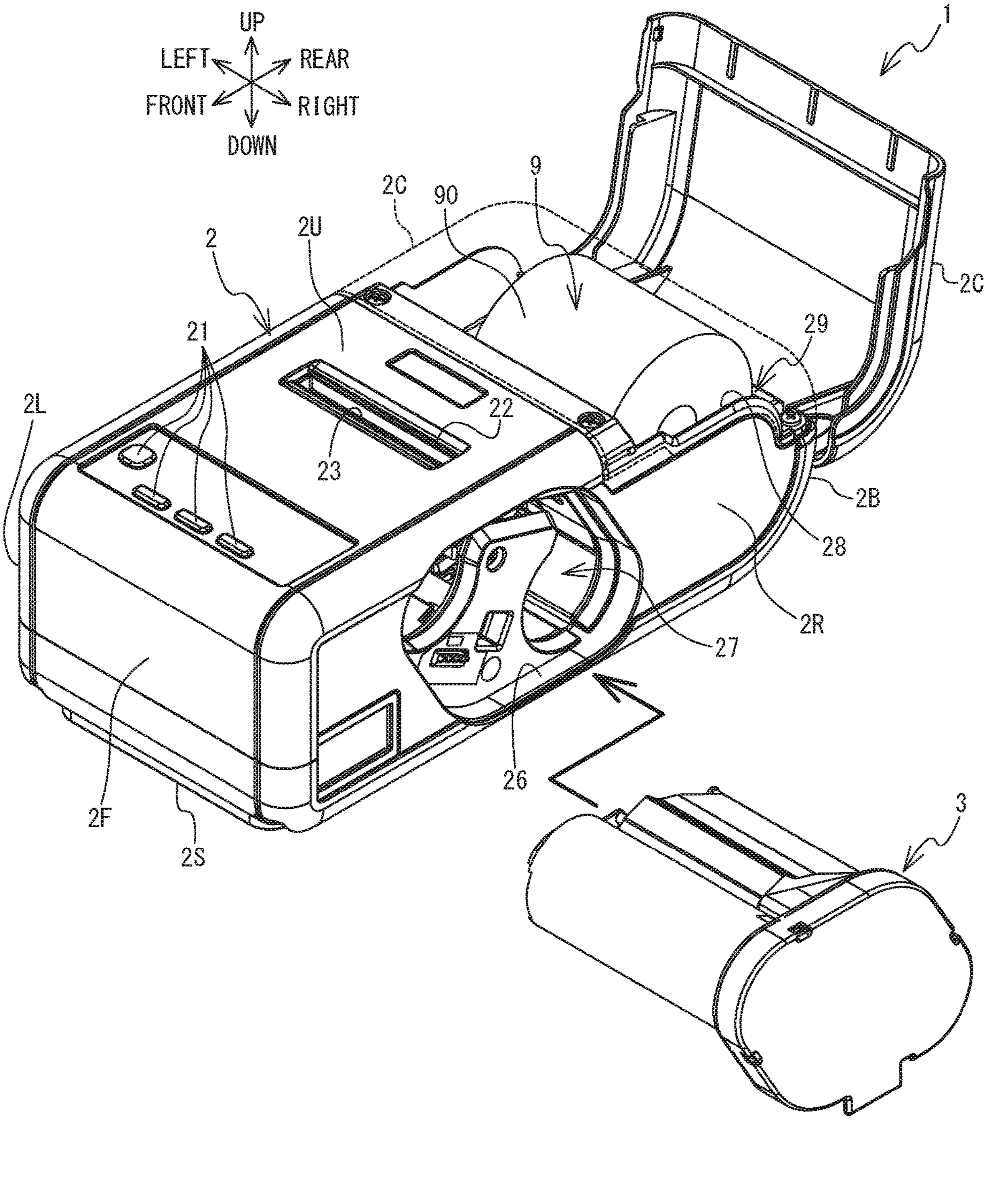
FIG. 1 is a perspective view of a print device.

As shown in FIG. 1, the print device 1 is provided with a case 2. The case 2 houses therein a frame 7 (refer to FIG. 2) of the print device 1. The frame 7 supports therein a platen roller 4, a print unit 5, a lever member 6, a control portion (not shown in the drawings), a drive portion 20, and the like. The control portion includes a CPU that performs overall control of the print device 1. The drive portion 20 is a motor for feeding the print medium 90 and the ink ribbon. The platen roller 4, the print unit 5, and the lever member 6 will be described in detail later. The case 2 is box-shaped, and includes an upper wall 2U, a lower wall 2S, a left wall 2L, a right wall 2R, a front wall 2F, a back wall 2B, and a lid portion 2C.

A plurality of switches 21 are provided on a front end portion of the upper surface of the upper wall 2U. A ejection portion 22 is also provided on the upper surface, further to the rear than the switches 21. The ejection portion 22 is a through hole formed in the upper wall 2U. The shape of the ejection portion 22 is a rectangle that is long in the left-right direction. The print medium 90 printed inside the case 2 is ejected to the outside of the case 2 via the ejection portion 22. A cutting portion 23 is provided on a front end portion of the ejection portion 22, and is a cutting blade that can cut off a printed section of the print medium 90.

An opening 26 is provided in the right surface of the right wall 2R. The opening 26 is communicated with a ribbon installation portion 27 provided inside the case 2. A ribbon cartridge 3 is detachably mounted to the ribbon installation portion 27. Note that FIG. 1 shows a state in which the ribbon cartridge 3 is removed from the ribbon installation portion 27.

A ribbon roll around a cylindrical tube of which is wound an ink ribbon, and a winding roll for taking up the used ink ribbon (both not shown) are housed in the ribbon cartridge 3. The ink ribbon pulled out from the ribbon roll is fed to the front inside the case 2. In the feeding process, the ink ribbon is heated by the print head 50 to be described later. The heated ink ribbon is wound up on the winding roll.

Each of sections in the vicinity of the rear ends of the rear end portion of the upper wall 2U, the upper end portion of the back wall 2B, and the upper end portions of the left wall 2L and the right wall 2R form an opening 28 at the rear end portion of the case 2. The lid portion 2C is rotatably supported at the upper end portion of the back wall 2B, and can open and close the opening 28. FIG. 1 shows a state in which the opening 28 is opened by the lid portion 2C. Note that dotted lines in FIG. 1 indicate a state in which the opening 28 is closed by the lid portion 2C. The opening 28 is communicated with a medium installation portion 29 provided inside the case 2. A medium roll 9 around a cylindrical tube of which is wound the print medium 90 is detachably mounted to the medium installation portion 29. A user can replace the medium roll 9 by causing the opening 28 to be in the open state.

The print medium 90 is reeled out from the medium roll 9 mounted to the medium installation portion 29, and is fed to the front toward the ejection portion 22 inside the case 2. In the feeding process, a portion of the print medium 90 runs parallel to and above the ink ribbon reeled out from the ribbon roll of the ribbon cartridge 3. At portions (hereinafter referred to as "parallel running portions") that run parallel to each other of the print medium 90 and the ink ribbon, the ink ribbon is heated by the print head 50, and the ink of the ink ribbon is transferred to the print medium 90. The print medium 90 to which the ink has been transferred is ejected to the outside of the case 2 via the ejection portion 22.

Platen Roller 4

The platen roller 4 sandwiches the parallel running portions of the print medium 90 and the ink ribbon with the print head 50. As shown in FIG. 2 and FIG. 3, the platen roller 4 has a circular cylindrical shape. The platen roller 4 is disposed above the parallel running portion of the print medium 90. A through hole 40 that extends in the left-right direction is provided in the platen roller 4. A rotation shaft 4A is inserted through the through hole 40. The rotation shaft 4A extends in the left-right direction. Both left and right end portions of the rotation shaft 4A are fixed to the frame 7. Note that FIG. 2 shows the left side of the frame 7 and the upper side of the frame 7. The platen roller 4 is rotatably supported by the rotation shaft 4A. A center of rotation of the platen roller 4 is aligned with a center 4C of the rotation shaft 4A. The drive portion 20 is fixed to a front portion of the left-side frame 7. The left-side frame 7 includes a plurality of gears (not shown in the drawings) on a left side surface thereof. The plurality of gears transmit a driving force generated by the drive portion 20 to the platen roller 4.

Print Unit 5

The print unit 5 heats the parallel running portion of the ink ribbon, using the print head 50, and transfers the ink to the print medium 90. The print unit 5 is disposed below the parallel running portion of the ink ribbon. The print unit 5 includes a head holder 51, a movement portion 56, and a pair of springs 57.

The head holder 51 includes a base portion 51A and a pair of protruding portions 51B. The base portion 51A is a plate shape extending in the left-right direction and intersects the up-down direction. The pair of protruding portions 51B protrude toward the rear from the rear end portion at both the left and right end portions of the base portion 51A, respectively. Each of the pair of protruding portions 51B has a through hole that extends in the left-right direction. A support shaft 5A is inserted through the respective through holes of the pair of protruding portions 51B. The support shaft 5A extends in the left-right direction. Both the left and right end portions of the support shaft 5A are fixed to each of the left side and the right side of the frame 7. The head holder 51 is rotatably supported by the support shaft 5A. A center of rotation of the head holder 51 is aligned with a center 5C of the support shaft 5A. The center 5C is disposed lower than and to the rear of center 4C of the rotation shaft 4A that supports the platen roller 4.

Figure 2:
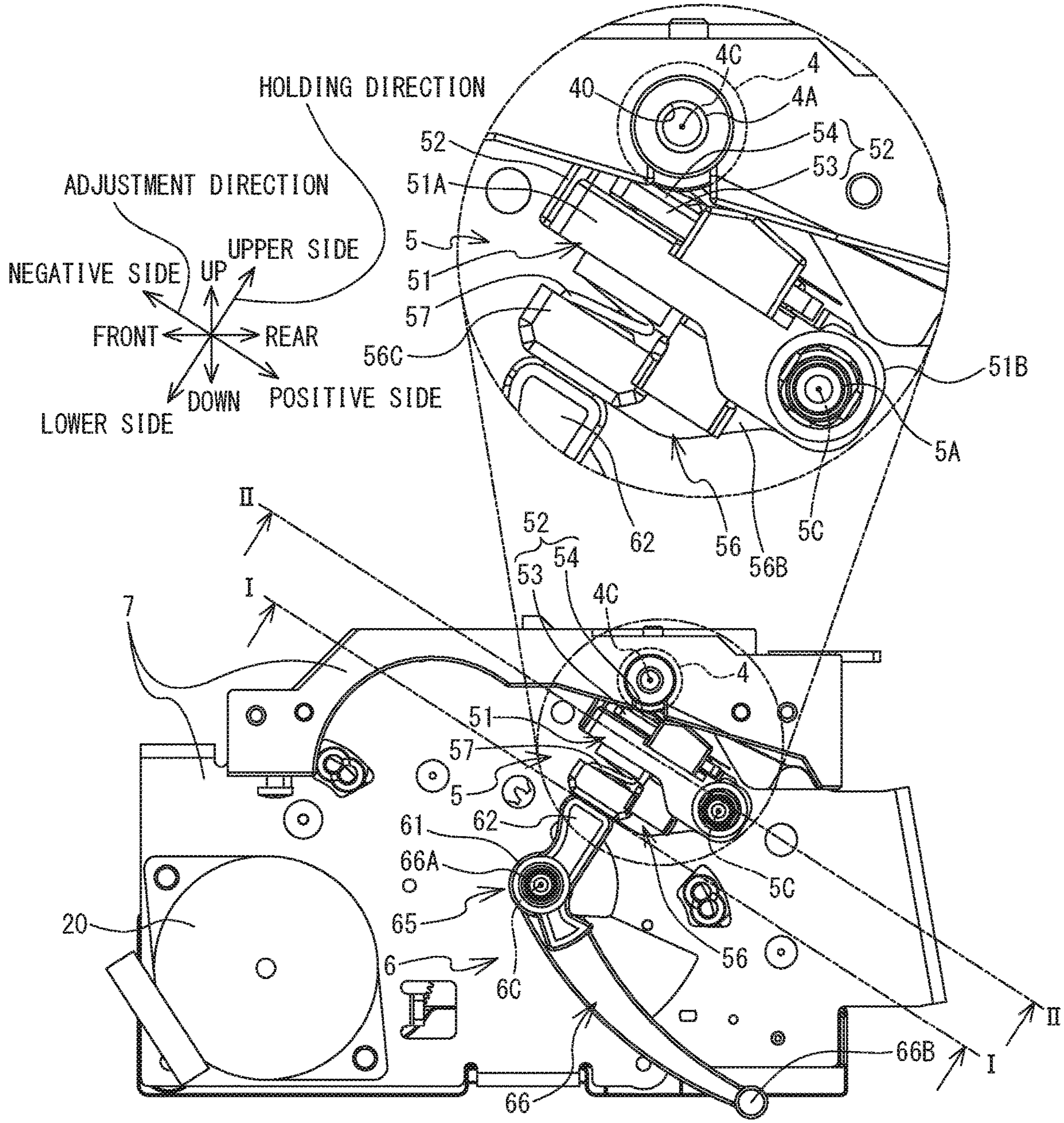
FIG. 2 is right side view showing positional relationships of a frame, a platen roller, a print unit, and a lever member.
Figure 3:
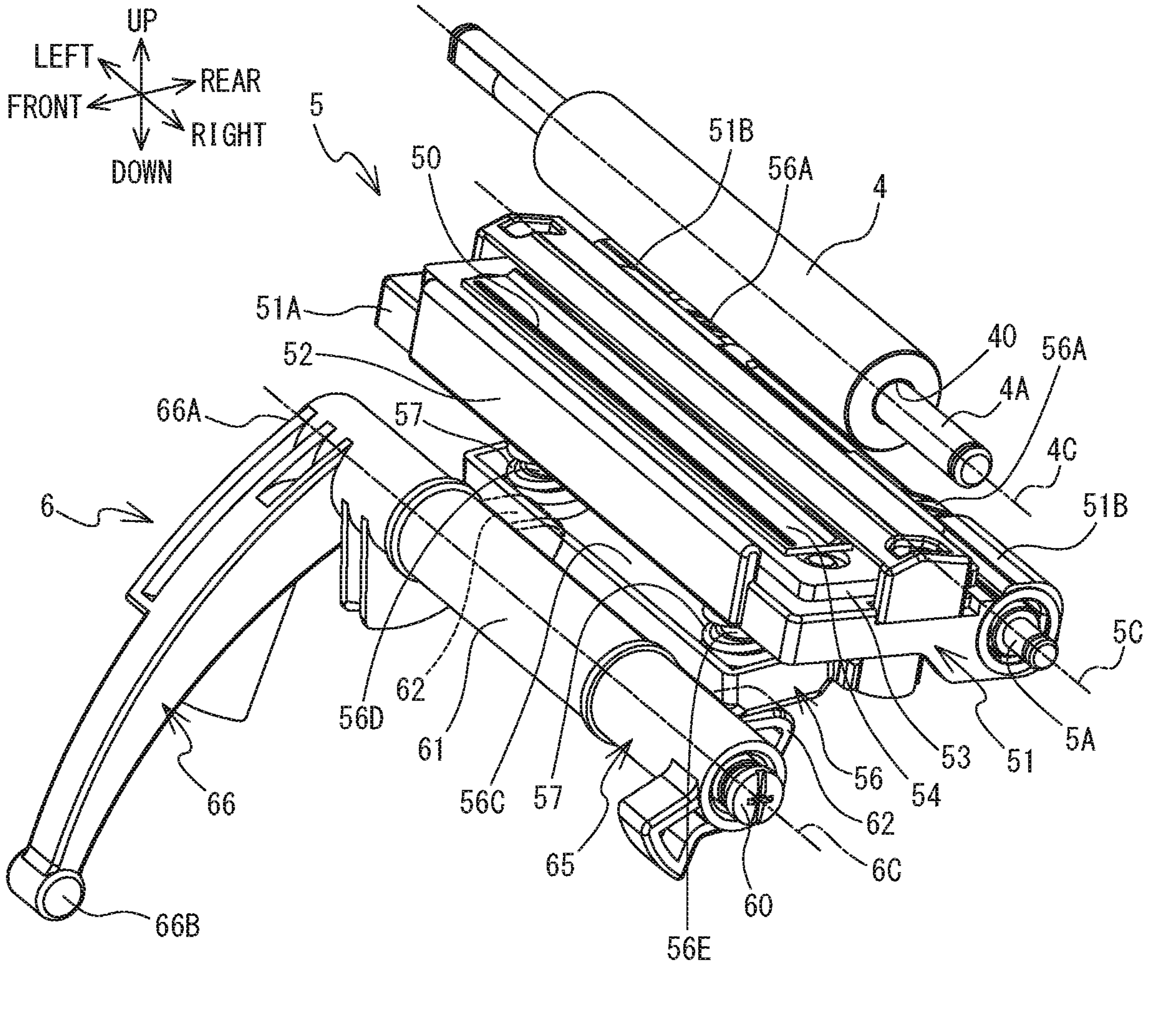
FIG. 3 is a perspective view of the platen roller, the print unit, and the lever member.

FIG. 3 shows a state in which the head holder 51 has been rotated to the maximum in the counter-clockwise direction, when viewed from the right, around the support shaft 5A. In this state, the base portion 51A is separated downward from the platen roller 4. Hereinafter, the position of the head holder 51 disposed at the rotation position shown in FIG. 3 will be referred to as a "separated position." On the other hand, FIG. 2 shows a state in which the head holder 51 has been rotated to the maximum in the clockwise direction, when viewed from the right, around the support shaft 5A. In this state, the base portion 51A comes close to the platen roller 4 from below. Hereinafter, the position of the head holder 51 disposed at the rotated position shown in FIG. 2 will be referred to as a "close position".

As shown in FIG. 2 and FIG. 3, the print head 50 is provided on the upper surface of a head substrate 54. The print head 50 is a line thermal head formed by a plurality of heating elements, and extends in the left-right direction. The head substrate 54 is fixed to the upper surface of a heat sink 53, by being adhered using an adhesive. The head substrate 54 and the heat sink 53 form an integrally fixed head unit 52. The head unit 52 is disposed with the heat sink 53 on the lower side, and is attached to the upper surface of the base portion 51A of the head holder 51.

The movement portion 56 includes a shaft bearing 56A, an extension portion 56B, and a spring bearing 56C. The shaft bearing 56A is disposed between the pair of protruding portions 51B of the head holder 51. The shaft bearing 56A includes a through hole that extends in the left-right direction. The support shaft 5A is inserted through the through hole of the shaft bearing 56A. The movement portion 56 is supported by the support shaft 5A so as to be able to pivot, with a front side thereof being a free end. A center of rotation of the movement portion 56 is aligned with the center 5C of the support shaft 5A. In other words, both the head holder 51 and the movement portion 56 can rotate around the support shaft 5A. The extension portion 56B extends diagonally to the front and downward from the shaft bearing 56A. The spring bearing 56C is provided at the front end portion of the extension portion 56B. The spring bearing 56C is disposed below the base portion 51A of the head holder 51. The spring bearing 56C receives a pair of springs 57, on the upper surface thereof.

The pair of springs 57 are disposed higher than the spring bearing 56C and in the vicinity of both the left and right ends of the spring bearing 56C. A pair of protrusions 56D and 56E are formed at the spring bearing 56C. Each of the pair of springs 57 is a compression coil spring. The lower end portions of the pair of springs 57 respectively fit with the protrusions 56D and 56E. The pair of springs 57 are interposed between an urging section 53C of the head unit 52 that is fixed to the base portion 51A of the head holder 51, and the spring bearing 56C of the movement portion 56 (refer to FIG. 10).

Lever Member 6

The lever member 6 receives an operation by the user and presses the print head 50 of the print unit 5 to the side of the platen roller 4. The lever member 6 includes a pressing portion 65 and an operation portion 66.

The pressing portion 65 includes a shaft bearing 61 and a pair of contact portions 62. The shaft bearing 61 has a circular cylindrical shape and extends in the left-right direction. The shaft bearing 61 includes a through hole that extends in the left-right direction. A rotation shaft (hereinafter referred to as a "lever rotation shaft") that is not shown and is fixed inside the case 2 is inserted through the through hole of the shaft bearing 61, from the left end portion thereof, and extends as far as the right end portion thereof. The right end portion of the lever rotation shaft is screwed into place, using a screw 60, such that the shaft bearing 61 does not become displaced from the lever rotation shaft. A center of rotation of the lever rotation shaft is referred to as a "center 6C." The center 6C is disposed lower than the center 5C of the support shaft 5A supporting the print unit 5, and to the front of the center 4C of the rotation shaft 4A supporting the platen roller 4. Each of the pair of contact portions 62 protrudes from the shaft bearing 61 in a radial direction, centered on the center 6C of the lever rotation shaft. The pair of contact portions 62 are separated in the left-right direction that is a direction parallel to the lever rotation shaft. The interval in the left-right direction between each of the pair of contact portions 62 substantially matches the interval in the left-right direction between the pair of springs 57. The pair of contact portions 62 can come into contact, from below, with the spring bearing 56C of the movement portion 56. The operation portion 66 has a bar shape that extends while curving from an one end portion 66A toward the other end portion 66B. The one end portion 66A is coupled to the left end portion of the shaft bearing 61.

The lever member 6 is rotatably supported by the lever rotation shaft. A center of rotation of the lever member 6 is aligned with the center 6C of the lever rotation shaft. FIG. 3 shows a state in which the lever member 6 has been rotated to the maximum around the lever rotation shaft in the clockwise direction, when viewed from the right. In this state, the pair of contact portions 62 of the pressing portion 65 are slightly separated, downward, from the spring bearing 56C of the movement portion 56. In this case, the pair of springs 57 interposed between the spring bearing 56C and the head holder 51 are not compressed and do not press the head holder 51. Thus, the head holder 51 is disposed in a separated position.

In the course of the lever member 6 being rotated in the counter-clockwise direction when viewed from the right, the pair of contact portions 62 of the pressing portion 65 come into contact, from below, with the spring bearing 56C of the head holder 51, and apply a force urging the spring bearing 56C upward. The movement portion 56 rotates in the clockwise direction, when viewed from the right, in accordance with the force received from the pair of contact portions 62 by the spring bearing 56C. Further, the head holder 51 rotates in the clockwise direction, when viewed from the right, in accordance with receiving the upward force from the movement portion 56, via the pair of springs 57. As a result, the head holder 51 moves from the separated position to the close position.

FIG. 2 shows a state in which the lever member 6 has been rotated to the maximum around the lever rotation shaft in the counter-clockwise direction, when viewed from the right. In this state, the pair of springs 57 are compressed. The pair of springs 57 press the head holder 51, as a result of an elastic force generated by the compression. In this case, the print head 50 of the head holder 51 is pressed to the side of the platen roller 4.

Position Adjustment Function of Print Unit 5

The print head 50 of the print device 1 of the present embodiment is provided with adjustment mechanisms 70 that are able to adjust the positional relationship of the print unit 5 with respect to the platen roller 4. The adjustment mechanism 70 will be described with reference to FIG. 4 to FIG. 10. Note that, in the following description, a thickness direction of the heat sink 53 and the head substrate 54, which is the direction in which the head holder 51 holds the head unit 52, is defined as a "holding direction" of the print unit 5. Further, in the print unit 5, taking a state in which the print head 50 is in the close position as reference, the side of the heat sink 53 in the holding direction is referred to as an "upper side" and the side of the head holder 51 in the holding direction is referred to as a "lower side." Further, taking the state in which the print head 50 is in the close position as reference, a feed direction of the print medium 90 with respect to the print unit 5 is a direction orthogonal to the left-right direction in which the print head 50 extends, and the thickness direction of the head substrate 54. In the following description, a direction that is substantially aligned with the feed direction at the time of printing is defined as an "adjustment direction" of the print unit 5. In other words, in the print unit 5, the adjustment direction is a direction in which the position of the heat sink 53 with respect to the head holder 51 is adjusted. Further, in the adjustment direction, an orientation in which an adjustment to move the print head 50 upstream in the feed direction of the print medium 90 with respect to the platen roller 4 is referred to as a "positive side," and an orientation of an adjustment to move the print head 50 downstream is referred to as a "negative side."

Figure 4:
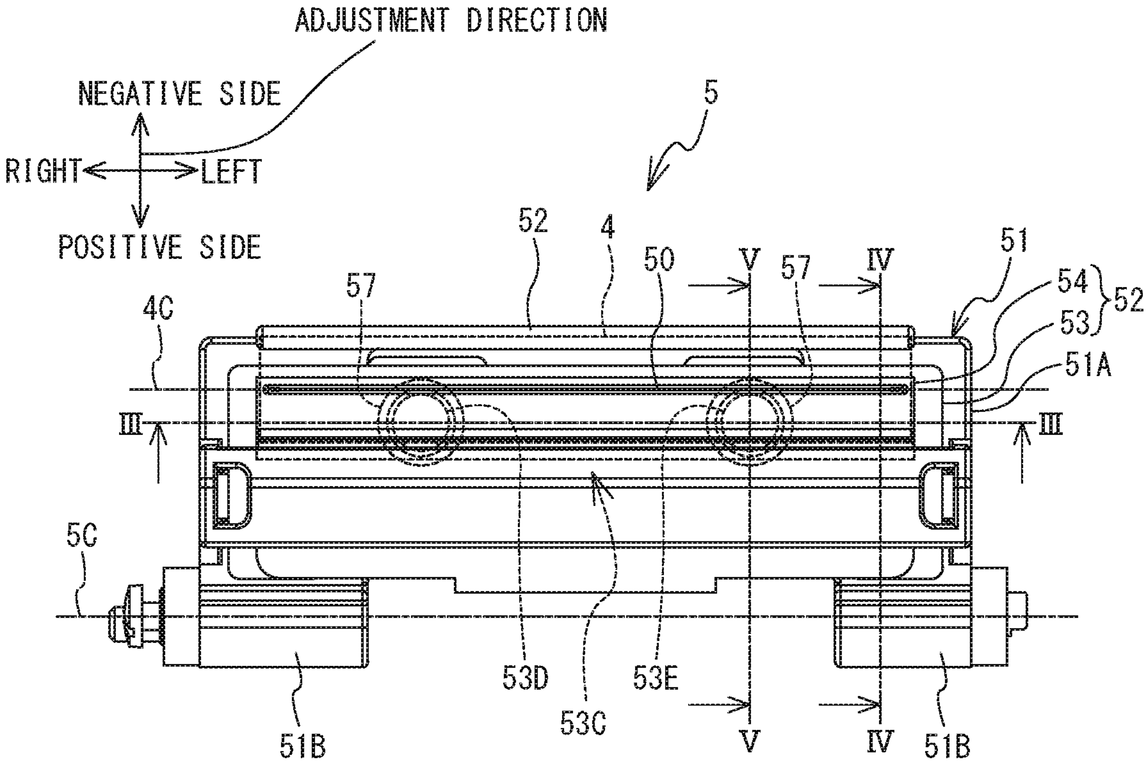
FIG. 4 is a plan view of the print unit.
Figure 5:
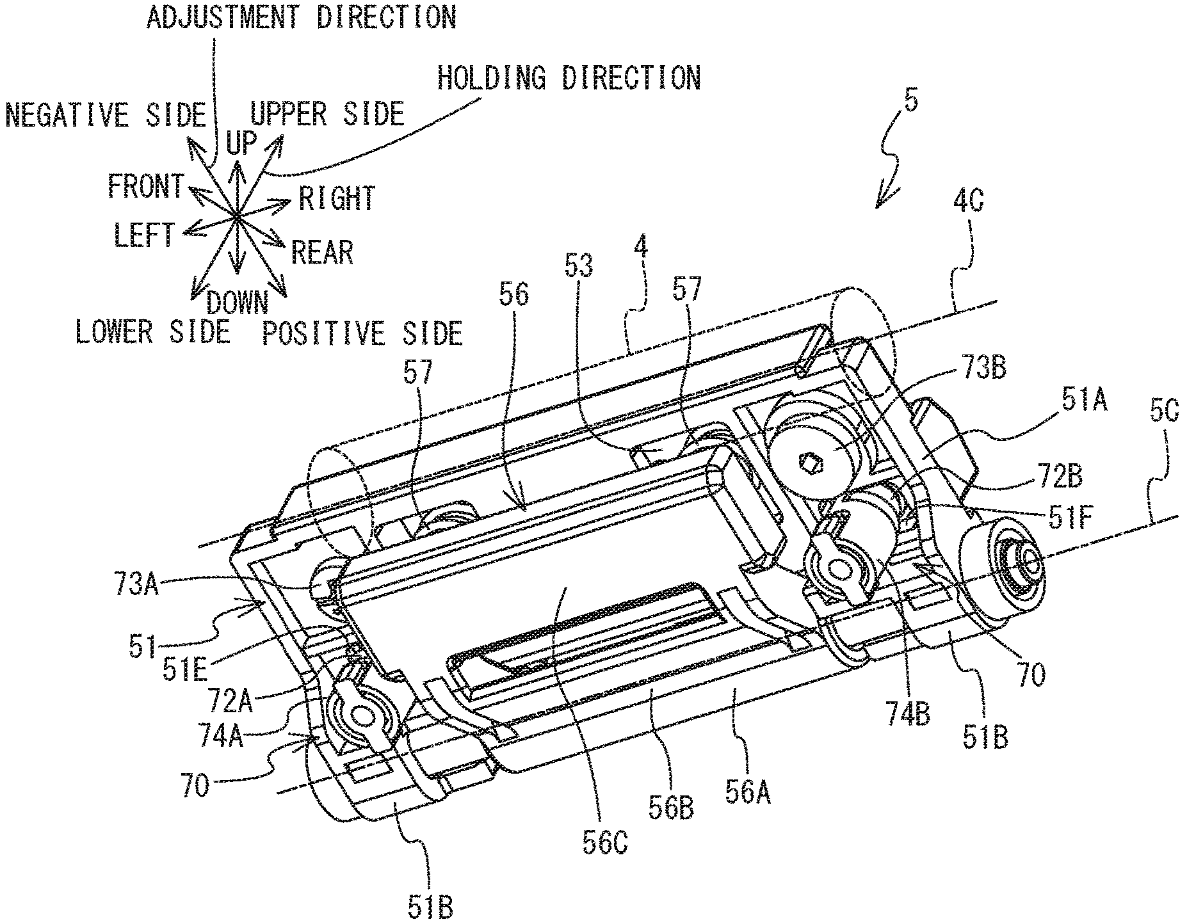
FIG. 5 is a perspective view of the print unit as viewed from below.

The adjustment mechanism 70 is a mechanism that moves the position of the head unit 52 with respect to the head holder 51 in the adjustment direction, in order to adjust the positional relationship of the print head 50 with respect to the platen roller 4. As shown in FIG. 4, at the upper surface of the head substrate 54, the print head 50 is provided extending in the left-right direction at a position closer to an end portion on the negative side in the adjustment direction. The head substrate 54 extends long in the left-right direction, and the length thereof in the adjustment direction is approximately half the size of the heat sink 53. The head substrate 54 is fixed to the upper surface of the heat sink 53 at a position closer to the negative side in the adjustment direction. The heat sink 53 is disposed on the upper surface of the base portion 51A of the head holder 51, and is fixed by tightening two fixing screws 73A and 73B (refer to FIG. 5). In other words, as the head unit 52 in which the head substrate 54 provided with the print head 50 and the heat sink 53 are integrated, the head unit 52 is held on the upper side in the holding direction of the head holder 51.

As shown in FIG. 5 to FIG. 10, the fixing screw 73A is a bolt in which a cross-shaped hole is formed. The fixing screen 73B is a bolt in which a hexagonal hole is formed. The outer diameter of a shaft of the fixing screw 73B is large than the outer diameter of a shaft of the fixing screw 73A. The heat sink 53 includes screw holes 53A and 53B, into which the fixing screws 73A and 73B are respectively tightened, at each of corner portions on the negative side in the adjustment direction and at both sides on the left and right. Each of the screw holes 53A and 53B is formed at a raised portion of the lower surface of the heat sink 53 obtained by being extruded downward from the upper surface side of the heat sink 53 by press working. At the upper surface of the heat sink 53, recessed portions 53F (refer to FIG. 9) are formed at positions corresponding to the screw holes 53A and 53B.

At the lower surface of the heat sink 53, the section between the screw holes 53A and 53B is the urging section 53C at which the upper end portions of the springs 57 press the head unit 52 upward. A pair of protrusions 53D and 53E, which protrude below the heat sink 53, are provided at the urging section 53C. The protrusions 53D and 53E are formed at positions mutually separated in the left-right direction. Each of the protrusions 53D and 53E is formed protruding in a circular cylindrical shape by being extruded downward from the upper surface of the heat sink 53 by press working. At the upper surface of the heat sink 53, recessed portions 53G (refer to FIG. 10) are provided at positions corresponding to the protrusions 53D and 53E.

In this way, respective formation positions of the recessed portions 53F and 53G in the adjustment direction are positions not overlapping, in the holding direction, with a formation position of the print head 50 provided at the head substrate 54 adhered to the heat sink 53. Thus, in the holding direction of the print head 50, spaces created by the recessed portions 53F and 53G are not disposed between the head substrate 54 and the heat sink 53. As a result, the heat sink 53 can deploy a sufficient heat-dissipating effect with respect to heat transmitted from the head substrate 54 in accordance with the driving of the print head 50.

Figure 7:
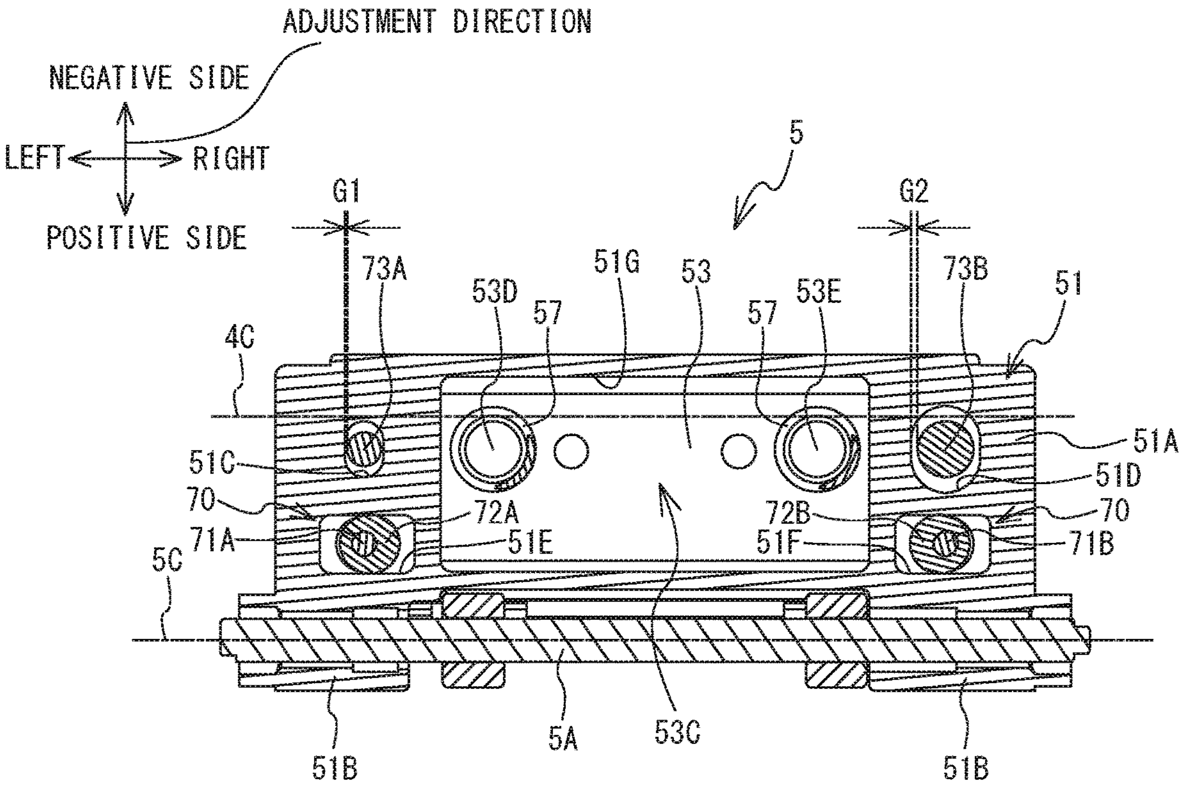
FIG. 7 is a cross-sectional view of the print unit as viewed in the direction of arrows along a line II-II shown in FIG. 2.
Figure 8:
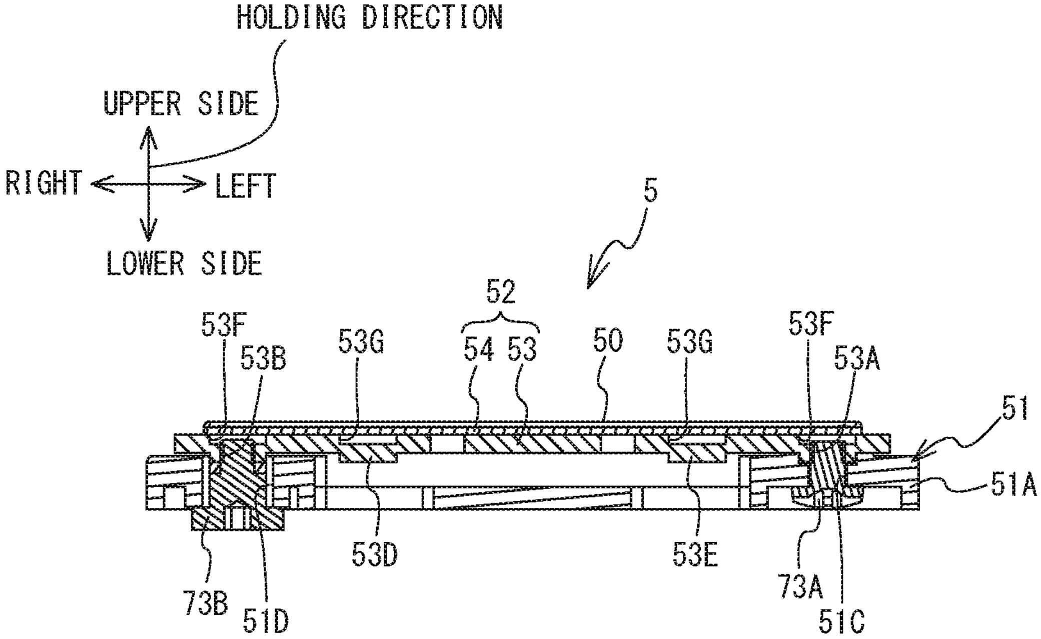
FIG. 8 is a cross-sectional view of the print unit as viewed in the direction of arrows along a line shown in FIG. 4.
Figure 9:
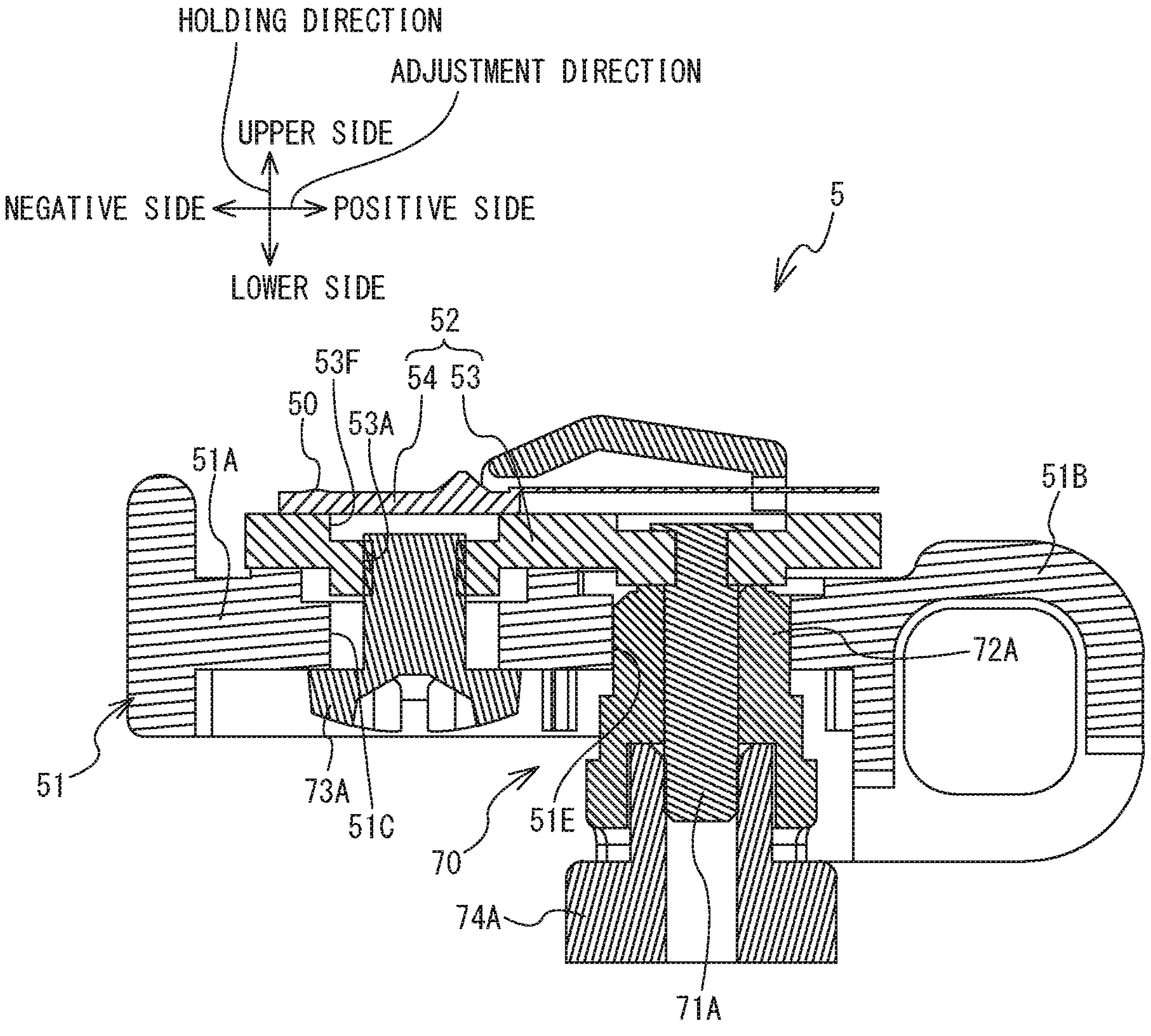
FIG. 9 is a cross-sectional view of the print unit as viewed in the direction of arrows along a line IV-IV shown in FIG. 4.

As shown in FIG. 7, the heat sink 53 includes a pair of adjustment shafts 71A and 71B on the positive side in the adjustment direction of each of the screw holes 53A and 53B in the adjustment direction. Each of the adjustment shafts 71A and 71B is a round bar shape, is fixed to the lower surface of the heat sink 53 by crimping, and extends downward in the holding direction.

The base portion 51A of the head holder 51 includes insertion holes 51C and 51D, which penetrate in the holding direction and through which the shafts of the fixing screws 73A and 73B are respectively inserted, at each of corner portions on the negative side in the adjustment direction and at both sides on the left and right. Each of the insertion holes 51C and 51D has an elliptical shape that is long in the adjustment direction. Formation positions of the insertion holes 51C and 51D are positions at which the screw holes 53A and 53B of the heat sink 53 are respectively disposed inside the insertion holes 51C and 51D in the holding direction (refer to FIG. 8). The length in the left-right direction of the insertion hole 51C is substantially the same as the outer diameter of the shaft of the fixing screw 73A, and the length of the insertion hole 51C in the adjustment direction is greater than the outer diameter of the shaft of the fixing screw 73A. A gap G1 formed between the insertion hole 51C and the shaft of the fixing screw 73A in the left-right direction is of a sufficient size not to obstruct the smooth movement of the shaft in the adjustment direction. As a result of the shaft of the fixing screw 73A being guided by the insertion hole 51C, the adjustment mechanism 70 can regulate the positional adjustment of the print head 50 in the left-right direction, and can restrict the movement of the print head 50 to the adjustment direction.

A gap G2 formed between the insertion hole 51D and the fixing screw 73B in the left-right direction is larger than the gap G1. When subject to the influence of heat generated by the driving of the print head 50, of the heat sink 53 that is long in the left-right direction, the length extending in the left-right direction becomes larger than the adjustment direction as a result of thermal expansion. Using the gap G2, the print unit 5 absorbs the extension in the left-right direction of the heat sink 53 with respect to the head holder 51, which can arise due to the thermal expansion, and can inhibit positional displacement of the print head 50. Then, as a result of the insertion hole 51D guiding the shaft of the fixing screw 73B, the adjustment mechanism 70 can perform the positional adjustment of the print head 50 in the adjustment direction.

The base portion 51A of the head holder 51 includes cam holes 51E and 51F, which penetrate in the holding direction, at positions at which the two adjustment mechanisms 70 are respectively disposed, on the positive side in the adjustment direction of each of the insertion holes 51C and 51D in the adjustment direction. The two adjustment mechanisms 70 are an adjustment shaft 71A and an eccentric cam 72A, and an adjustment shaft 71B and an eccentric cam 72B. Each of the cam holes 51E and 51F has a substantially rectangular shape that is long in the left-right direction. The adjustment shafts 71A and 71B rotatably support the eccentric cams 72A and 72B, respectively. The adjustment shafts 71A and 71B are disposed substantially at the center of the cam holes 51E and 51F, respectively. A cross-sectional shape of the eccentric cams 72A and 72B in the holding direction is circular, and the eccentric cams 72A and 72B include insertion holes for the adjustment shafts 71A and 71B, which are provided at positions offset from the center of the cross section. A length of each of the cam holes 51E and 51F in the adjustment direction is substantially the same as a diameter of the cross-section of the eccentric cams 72A and 72B. The eccentric cams 72A and 72B are able to rotate around the adjustment shafts 71A and 71B, respectively, and come into contact with the cam holes 51E and 51F in the adjustment direction, in a state of being offset with respect to the adjustment shafts 71A and 71B. Grip portions 74A and 74B are respectively fixed to the lower end portions of the eccentric cams 72A and 72B (refer to FIG. 5). An operator can operate the grip portions 74A and 74B, and can rotate each of the eccentric cams 72A and 72B.

Further, the base portion 51A of the head holder 51 includes an opening portion 51G, for inserting the springs 57 in the holding direction, between the insertion hole 51C and the cam hole 51E, and the insertion hole 51D and the cam hole 51F in the left-right direction. The urging section 53C of the head unit 52 is exposed on the lower side in the holding direction, via the opening portion 51G.

Figure 10:
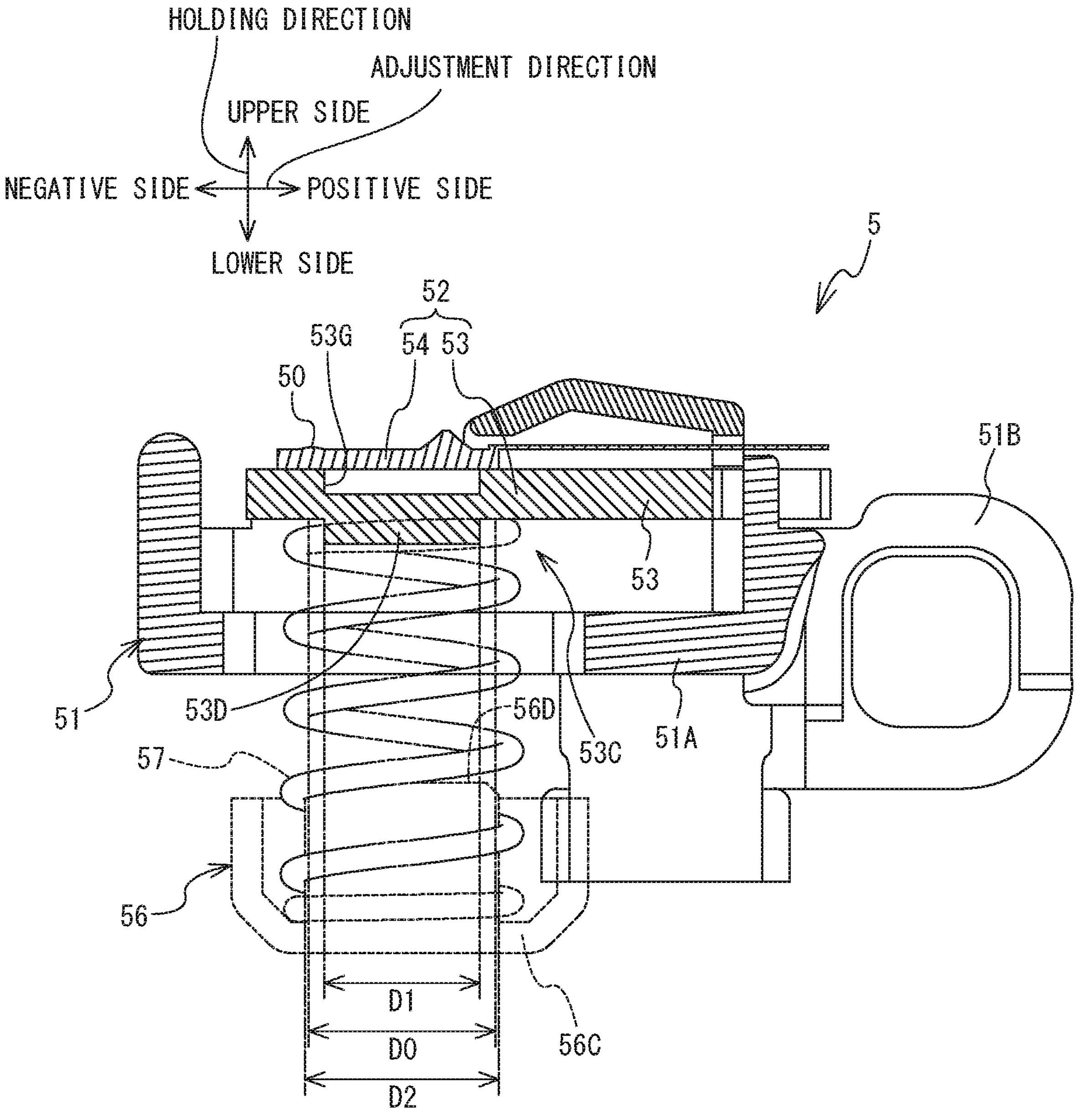
FIG. 10 is a cross-sectional view of the print unit as viewed in the direction of arrows along a line V-V shown in FIG. 4.

As shown in FIG. 10, in the print unit 5, the pair of springs 57 are disposed between the protrusions 53D and 53E formed at the urging portion 53C of the head unit 52, and between the protrusions 56D and 56E formed at the spring bearing 56C of the movement portion 56. An outer diameter D2 of the protrusions 56D and 56E of the spring bearing 56C is larger than an inner diameter D0 of the springs 57. The lower end portions of the springs 57 are fitted to the protrusions 56D and 56E, and are inhibited from becoming detached. An outer diameter D1 of the protrusions 53D and 53E of the urging section 53C is smaller than the inner diameter D0 of the springs 57. The protrusions 53D and 53E are disposed inside the upper end portions of the springs 57, and suppress positional displacement of the upper end portions of the springs 57 at the urging section 53C. Further, when the position of the head unit 52 is changed by the adjustment mechanisms 70, or when the heat sink 53 has thermally expanded, even if relative positions between the protrusions 53D and 53E and the upper end portions of the springs 57 are displaced from an original position, the protrusions 53D and 53E can absorb the positional displacement due to the difference in diameters.

As shown in FIG. 7, with respect to the adjustment mechanisms 70, arrangement positions of the pair of springs 57 are disposed at mutually separated positions in the left-right direction. In this way, the pair of springs 57 can apply a pressing load to the print head 50 in a uniform manner in the left-right direction. Further, the print unit 5 is configured such that the two adjustment mechanisms 70 are provided at mutually separated positions in the left-right direction, and the pair of springs 57 are disposed between the adjustment mechanisms 70. In other words, in the left-right direction, the grip portions 74A and 74B and the fixing screws 73A and 73B are disposed on the outside of the spring bearing 56C and the urging section 53C. Thus, in the print unit 5, the operation of the grip portions 74A and 74B, and a tightening operation of the fixing screws 73A and 73B are not likely to be obstructed by the spring bearing 56C and the urging section 53C.

Further, in the adjustment direction, the two adjustment mechanisms 70 are disposed between the urging section 53C of the head unit 52 and the support shaft 5A that supports the head holder 51. The print unit 5 is configured such that it is possible to apply a sufficient pressing load to the head unit 52 by the springs 57, while securing the distance between the urging section 53C and the support shaft 5A. In addition to this, by arranging the adjustment mechanisms 70 that perform the positional adjustment of the head unit 52 between the urging section 53C and the support shaft 5A, an arrangement layout of each of components in the print unit 5 can be made more efficient, and an increase in size of the print unit 5 can be suppressed.

Figure 6:
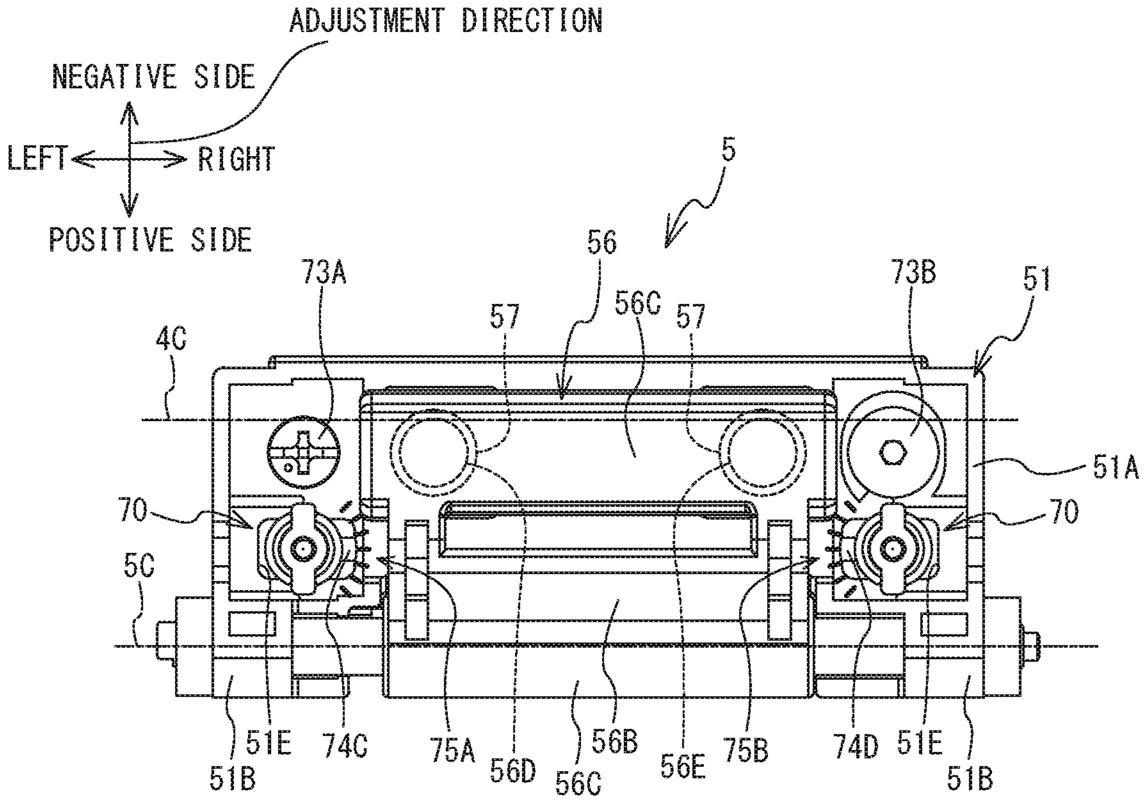
FIG. 6 is a bottom view of the print unit as viewed in the direction of arrows along a line I-I shown in FIG. 2.

As shown in FIG. 6, the head holder 51 includes scales 75A and 75B at the lower surface thereof. The scale 75A is formed to the right side of the adjustment shaft 71A, around the cam hole 51E in which the eccentric cam 72A is disposed, and is aligned in a circular arc shape centered on the adjustment shaft 71A. The scale 75B is formed to the left side of the adjustment shaft 71B, around the cam hole 51F in which the eccentric cam 72B is disposed, and is aligned in a circular arc shape centered on the adjustment shaft 71B. The grip portions 74A and 74B of the eccentric cams 72A and 72B respectively include indicator pieces 74C and 74D. The indicator pieces 74C and 74D are protruding portions that protrude from outer peripheral surfaces of the grip portions 74A and 74B, toward one direction in the radial direction of the respective adjustment shafts 71A and 71B. The indicator piece 74C of the grip portion 74A protrudes toward the right, and specifies the scale 75A when seen from the lower side in the holding direction. The indicator piece 74D of the grip portion 74B protrudes toward the left, and specifies the scale 75B when seen from the lower side in the holding direction. In other words, the adjustment mechanisms 70 can indicate the position of the head unit 52 in the adjustment direction with respect to the head holder 51, using the positions of the scales 75A and 75B specified by the indicator pieces 74C and 74D.

Positional Adjustment Operation of Print Head 50

Using the adjustment mechanisms 70 as described above, an operation to adjust the positional relationship of the print head 50 with respect to the platen roller 4 is performed in the course of manufacturing the print device 1, for example. The print device 1 is configured such that the operator can loosen the fixing screws 73A and 73B of the print unit 5, and move the position of the head unit 52 with respect to the head holder 51. Next, the operator rotates the grip portions 74A and 74B while verifying the positions of the scales 75A and 75B indicated by the indicator pieces 74C and 74D. The eccentric cams 72A and 72B respectively press the cam holes 51E and 51F, and the insertion holes 51C and 51D respectively guide the shafts of the fixing screws 73A and 73B in the adjustment direction. The head unit 52 moves to the positive side or the negative side in the adjustment direction, with respect to the head holder 51. In this way, the positional adjustment of the print head 50 with respect to the platen roller 4 is performed in the adjustment direction. After the positional adjustment, the operator tightens the fixing screws 73A and 73B, fixes the head unit 52 to the head holder 51, and ends the operation.

Printing Operation

A user operates the operation portion 66 of the print device 1 and rotates the lever member 6 in the clockwise direction, as viewed from the right. In this way, the platen roller 4 and the base portion 51A of the head holder 51, of the print unit 5, are separated in the up-down direction. Next, the user mounts the ribbon cartridge 3 to the print device 1. Next, the user mounts the medium roll 9 to the print device 1, and reels out the print medium 90 to the front and guides the print medium 90 to the ejection portion 22. At this time, the parallel running portions of each of the ink ribbon of the ribbon cartridge 3 and of the print medium 90 pass between the platen roller 4 and the head holder 51. Note that this is a state in which the print head 50 supported by the head holder 51 and the ink ribbon are separated from each other, and thus, the printing operation cannot be performed in this state.

Next, the user operates the operation portion 66, and rotates the lever member 6 in the counter-clockwise direction, as viewed from the right. In this way, the respective parallel running portions of the ink ribbon and of the print medium 90 are clamped by the platen roller 4 and the head holder 51. At this time, the platen roller 4 comes into contact with the print medium 90 from above, and the print head 50 comes into contact with the ink ribbon from below. Further, due to the elastic force of the pair of springs 57, the print head 50 supported by the head holder 51 is pressed to the side of the platen roller 4.

Next, the user performs an input operation on the switches 21 to start the printing operation. The print device 1 starts the printing operation. The control portion controls the drive portion 20, and feeds the print medium 90 and the ink ribbon. At the same time, the control portion starts heating the print head 50. In this way, the ink ribbon is heated and the ink is transferred to the print medium 90. The print medium 90 to which the ink has been transferred is ejected from the ejection portion 22.

Actions and Effects of Embodiment

As described above, the print unit 5 is provided with the adjustment mechanisms 70 at positions between the support shaft 5A and the urging section 53C, which enables the springs 57 to apply the sufficient pressing load to the head unit 52 held by the head holder 51 that pivots while being supported by the support shaft 5A. As a result, the print device 1 can achieve downsizing of the head unit 52 and can thus achieve downsizing of the manufactured product.

As a result of the downsizing of the head unit 52, it is more susceptible to being influenced by the heat generated by the driving of the print head 50. When the heat sink 53 expands due to the heat, the heat sink 53 is likely to become longer in the left-right direction in which the heating elements are aligned. Even when the heat sink 53 expands, the head unit 52 can be inhibited from being displaced with respect to the head holder 51, by the gap G2 in the left-right direction between the insertion hole 51D and the shaft of the fixing screw 73B.

The print unit 5 can easily perform the positional adjustment of the print head 50 with respect to the platen roller 4, using a rotation amount of the eccentric cams 72A and 72B that use the scales 75A and 75B as a reference.

The urging section 53C of the head unit 52 is formed by press working the heat sink 53, for example. Since the urging section 53C is formed to be displaced, in the adjustment direction, from a position corresponding to the arrangement position of the print head 50, the recessed portions 53F and 53G resulting from the press working are not positioned in the holding direction of the print head 50. Since there are no spaces between the print head 50 and the heat sink 53 in the holding direction of the print head 50, the heat sink 53 can deploy the sufficient heat-dissipating effect. As a result, the print unit 5 can inhibit the positional displacement of the head unit 52 with respect to the head holder 51.

There are gaps between the upper end portions of the springs 57 and the protrusions 53D and 53E in the radial direction of the protrusions 53D and 53E. Thus, while the positional displacement is possible as a result of changes in the positions of the protrusions 53D and 53E due to the positional adjustment of the head unit 52, or due to the thermal expansion of the heat sink 53, the upper end portions of the springs 57 can maintain the state of applying the pressing load to the head unit 52.

The springs 57 are disposed between the two adjustment mechanisms 70 in the left-right direction, and thus do not obstruct the operation of the grip portions 74A and 74B of the eccentric cams 72A and 72B. Thus, the print device 1 can achieve the downsizing of the print unit 5 while securing the ease of the positional adjustment of the head unit 52.

Modified Examples

The present disclosure is not limited to the above-described embodiment and various modifications are possible. The print method of the print device 1 is not limited to the thermal transfer method in which the ink of the ink ribbon is transferred by the heating of the print head 50. For example, the print method of the print device 1 may be a thermosensitive method that causes color development in a thermosensitive paper by heating the thermosensitive paper using the print head 50. In place of the pair of springs 57, a single spring may be used that is provided only at the center in the left-right direction. In place of the springs, an elastic member may be used that generates an elastic force by being compressed.

In place of the pair of eccentric cams 72A and 72B, a single eccentric cam may be used that is provided only at one or other of the left and right directions, or at the center in the left-right direction. The cross-sectional shape of the eccentric cams 72A and 72B is not limited to the circular shape, and may be elliptical. The eccentric cams 72A and 72B may be configured to be rotatable as a result of providing the adjustment shafts 71A and 71B at the eccentric cams 72A and 72B, and being used by being inserted into insertion holes formed in the heat sink 53.

In place of the pair of fixing screws 73A and 73B, a single fixing screw may be used that is provided only at one or other of the left and right directions, or at the center in the left-right direction. In place of the fixing screw 73A, a pin that is guided by the insertion hole 51C may be used, and may be fixed to the heat sink 53. The scales 75A and 75B may be formed by being printed on the head holder 51, or may be provided by machining the lower surface of the head holder 51.

What is claimed is:

1. A print device comprising:

a head unit configured to hold a heat sink to which is fixed a print head in which a plurality of heating elements is aligned in a first direction;

a head holding member configured to hold the head unit in a second direction intersecting the first direction;

a platen roller configured to rotate around a rotation shaft extending in the first direction;

a support shaft extending in the first direction and configured to support the head holding member to pivot between a close position and a separated position, the close position being a position where the print head is close to the platen roller, and the separated position being a position where the print head is separated from the platen roller further than the close position;

an urging member configured to urge the head unit and to apply a pressing load pressing the print head against the platen roller; and an adjustment mechanism including an adjustment shaft and an eccentric cam and provided at the heat sink, at a position between the support shaft and an urging section in a third direction, the adjustment mechanism being configured to adjust a position of the heating elements with respect to the platen roller when the print head is at the close position, by the head unit moving relative to the head holding member as a result of rotation of the eccentric cam, the adjustment shaft protruding to a side of the head holding member and extending in the second direction, the eccentric cam being configured to rotate around the adjustment shaft and coming into contact with the head holding member in a state of being offset with respect to the adjustment shaft, the third direction being a direction intersecting the first direction and the second direction, and the urging section being a section urging the head unit, using the urging member.

2. The print device according to claim 1, wherein the head holding member includes two insertion holes, fixing screws integrally fixing the heat sink and the head holding member being inserted through the two insertion holes at respective positions separated in the first direction, the heat sink includes two tightening portions, the two tightening portions respectively corresponding to the two insertion holes and the fixing screws being tightened by the tightening portions, and one of the two insertion holes includes a gap, in the first direction, with respect to an outer diameter of the fixing screw, that is larger than that of another insertion hole.

3. The print device according to claim 2, further comprising:

a scale provided at one of the heat sink or the head holding member, the scale extending in a circular arc shape centering on the adjustment shaft, and indicating a rotation position of the eccentric cam.

4. The print device according to claim 3, wherein the urging section of the heat sink is positioned to be displaced, in the third direction, with respect to a position corresponding, in the second direction, to an arrangement position of the heating elements of the print head.

5. The print device according to claim 4, wherein the urging member is a compression coil spring, and the print device further comprises:

a spring holding member disposed on an opposite side of the head unit from the head holding member and being configured to pivot together with the head holding member around the support shaft, the spring holding member including a first protrusion having a large diameter larger than an inner diameter of the compression coil spring, and holding one end of the compression coil spring using the first protrusion, and the urging section of the heat sink is formed as a second protrusion having a small diameter smaller than the inner diameter of the compression coil spring for determining a position of another end of the compression coil spring.

6. The print device according to claim 5, wherein two of the adjustment mechanisms are respectively provided at positions separated in the first direction, and the urging section is provided between the two adjustment mechanisms in the first direction.

7. The print device according to claim 2, wherein the urging section of the heat sink is positioned to be displaced, in the third direction, with respect to a position corresponding, in the second direction, to an arrangement position of the heating elements of the print head.

8. The print device according to claim 7, wherein the urging member is a compression coil spring, and the print device further comprises:

a spring holding member disposed on an opposite side of the head unit from the head holding member and being configured to pivot together with the head holding member around the support shaft, the spring holding member including a first protrusion having a large diameter larger than an inner diameter of the compression coil spring, and holding one end of the compression coil spring using the first protrusion, and the urging section of the heat sink is formed as a second protrusion having a small diameter smaller than the inner diameter of the compression coil spring for determining a position of another end of the compression coil spring.

9. The print device according to claim 8, wherein two of the adjustment mechanisms are respectively provided at positions separated in the first direction, and the urging section is provided between the two adjustment mechanisms in the first direction.

10. The print device according to claim 1, further comprising:

a scale provided at one of the heat sink or the head holding member, the scale extending in a circular arc shape centering on the adjustment shaft, and indicating a rotation position of the eccentric cam.

11. The print device according to claim 10, wherein the urging section of the heat sink is positioned to be displaced, in the third direction, with respect to a position corresponding, in the second direction, to an arrangement position of the heating elements of the print head.

12. The print device according to claim 11, wherein the urging member is a compression coil spring, and the print device further comprises:

a spring holding member disposed on an opposite side of the head unit from the head holding member and being configured to pivot together with the head holding member around the support shaft, the spring holding member including a first protrusion having a large diameter larger than an inner diameter of the compression coil spring, and holding one end of the compression coil spring using the first protrusion, and the urging section of the heat sink is formed as a second protrusion having a small diameter smaller than the inner diameter of the compression coil spring for determining a position of another end of the compression coil spring.

13. The print device according to claim 12, wherein two of the adjustment mechanisms are respectively provided at positions separated in the first direction, and the urging section is provided between the two adjustment mechanisms in the first direction.

14. The print device according to claim 1, wherein the urging section of the heat sink is positioned to be displaced, in the third direction, with respect to a position corresponding, in the second direction, to an arrangement position of the heating elements of the print head.

15. The print device according to claim 4, wherein the urging member is a compression coil spring, and the print device further comprises:

a spring holding member disposed on an opposite side of the head unit from the head holding member and being configured to pivot together with the head holding member around the support shaft, the spring holding member including a first protrusion having a large diameter larger than an inner diameter of the compression coil spring, and holding one end of the compression coil spring using the first protrusion, and the urging section of the heat sink is formed as a second protrusion having a small diameter smaller than the inner diameter of the compression coil spring for determining a position of another end of the compression coil spring.

16. The print device according to claim 15, wherein two of the adjustment mechanisms are respectively provided at positions separated in the first direction, and the urging section is provided between the two adjustment mechanisms in the first direction.

* * * * *